E. C. HORST.
GUARD FOR HOP PICKERS.
APPLICATION FILED MAY 5, 1910.
1,012,135.
Patented Dec. 19, 1911.
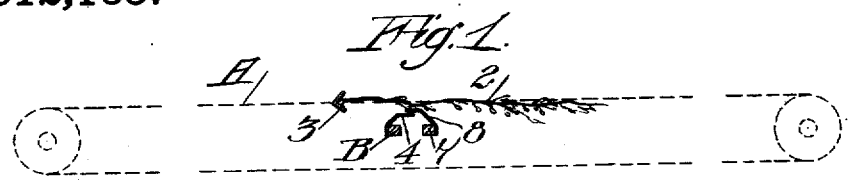
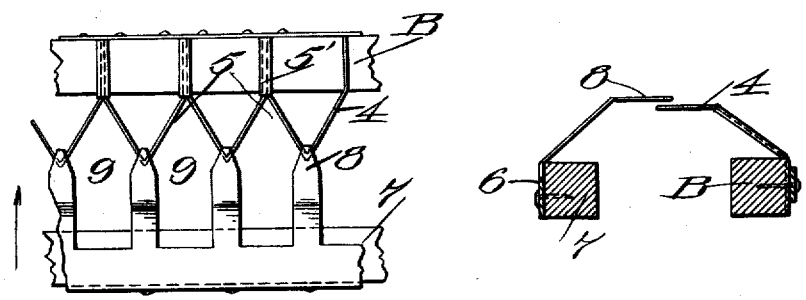 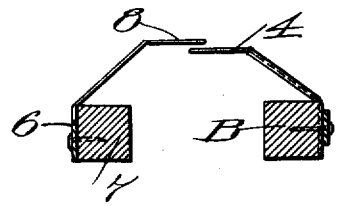
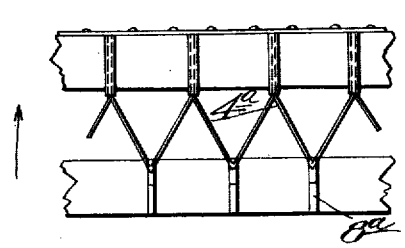 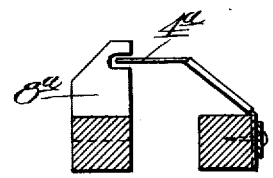
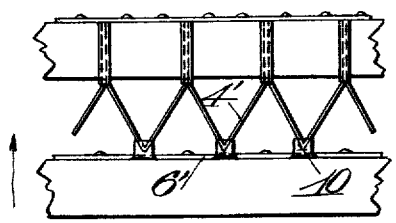 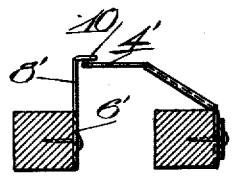

UNITED STATES PATENT OFFICE.

EMIL CLEMENS HORST, OF SAN FRANCISCO, CALIFORNIA.

GUARD FOR HOP-PICKERS.

1,012,135.  Specification of Letters Patent.  Patented Dec. 19, 1911.

Application filed May 5, 1910. Serial No. 559,614.

*To all whom it may concern:*

Be it known that I, EMIL CLEMENS HORST, citizen of the United States, residing in the city and county of San Francisco and State of California, have invented new and useful Improvements in Guards for Hop-Pickers, of which the following is a specification.

My invention relates to hop-picking machines, and machines of a kindred character.

The object of the present invention is to provide a simple, practical means for guarding the entering points of the picking devices, so that the hops or other fruit will not be broken or injured by forcible contact with any sharp points or projections.

The invention consists of the parts and the construction and combination of parts as hereinafter more fully described and claimed, having reference to the accompanying drawings, in which—

Figure 1 is a diagrammatic representation in side elevation of the invention. Figs. 2, 3 and 4 are plan views of different forms of guarding devices. Figs. 5, 6 and 7 are side elevations corresponding, respectively, to Figs. 2, 3 and 4.

A is an endless carrier of any suitable description to which the vines 2, carrying the hops or other fruit to be picked, are suitably attached by any appropriate means, represented at 3. The carrier A being operated at suitable speed by appropriate means, draws the vine 2 across the picking devices by which the hops or fruit are picked. These picking devices preferably consist of V-shaped or serrated pickers, represented at 4 in the drawings, with the apex 5 of each V-opening closed, and the wider end of the V-space open and presented toward the hops, as the same are drawn across the pickers by the carrier A; the hops dropping down into the V-opening and being severed from the stem when the hop catches in the crotch of the picker. These picking members 4 may be made either of wire or serrated plate. Preferably they are made of wire with angularly-bent stems connected in pairs by suitable means, as the sleeve 5', and these stems being properly secured to a part B supported independent of the carrier A.

The important feature of this invention is the means provided for guarding the open ends of the V-shaped pickers. In addition to having the apex of the V closed, the heel or serrated edge of the picker is preferably guarded, so that the hops will not be speared or torn by hitting any sharp or pointed edges. Therefore, to that end I provide a suitable form of guard whereby the hops are led or directed into the V-openings in a suitable manner. In Figs. 2 and 5, these guards for a V-opening consist of a plate 6 suitably secured to a fixed support 7 arranged below the plane of the pickers 4; the plate 6 having backwardly-inclined and horizontally-extended, comparatively narrow and tapered guard projections or members 8 slightly overlapping the points of the pickers, as shown in Fig. 2. A vine traveling in the direction of the arrow, Fig. 1, passes over the pickers, the depending hops being received into the guarded spaces 9 and into the picker to be severed thereby from the vine. Essentially the same principle of guarding is shown in Figs. 3, 4, 6 and 7. In Figs. 3 and 6, the guard plate 6' has vertical narrow projections 8' with bent-over ends 10 guarding the underneath points of the pickers 4'. In Figs. 4 and 7, I have shown upright plates 8ª fastened on edge, with their upper tapered ends notched to receive the points of the pickers 4ª. It is manifest that this system of guarding would be the same whether the pickers were stationary or moving, or whether the guard members were stationary or moving.

One of the principal reasons for guarding the picking fingers is to keep the bulk of the vines and leaves off of the pickers, and to provide means for picking clean hops, with a minimum of clusters, and to prevent the dismembering of the vines, which would take place if the ends of the serrated pickers were not guarded. Without guards there is nothing to prevent the catching of either the branches or main portion of a vine itself in the closed V of the picking member, which would result in a lot of unnecessary trash being picked or torn off with the hops. These broken portions of branches or vines would become waste and adhere to the picking members, thereby destroying their efficiency; besides, this trash would detract from the value of the picked product. By the use of the guards the vines are supported and only the protruding hops are caught and picked.

Having thus described my invention, what

I claim and desire to secure by Letters Patent is—

1. The combination with a vine carrier, of a serrated picker engageable by the fruit on the vine carried by the carrier, and guard members projecting forward in continuation of the points of the picker, said guard members comprising plates supported independent of the pickers and overhanging the points thereof, and between which plates the hops have free entry into the V-shaped picking space provided by said serrated pickers.

2. A hop-picking device consisting of a suitably supported serrated picking member having V-shaped openings, with the apices of the openings closed, and the heel of said openings guarded by independently supported members which are in continuation of the points of the picker.

3. A hop-picking device comprising a series of V-shaped pickers arranged side by side in line, said pickers made of wire bent to present V-shaped picking openings and to form contiguous supporting stems for the walls forming these openings, these stems bound together to form a closure for the apexes of the V-openings, and suitable guard means for the points of the open ends of said V-openings.

4. A hop-picking device made of wire bent to provide a succession of V-shaped openings, with suitable supporting means at the apexes of the V-openings, and guarding members at the mouth of the openings and in the bend formed by the convergent walls of two of said V-shaped openings, and said members having their point of attachment forward and out of the plane of the picker.

5. A hop picker comprising, in combination, a support, a plurality of wires attached to said support and bent in such manner as to form V-shaped openings, and a guard for the projecting outer points of the bent wires, said guard being normally out of contact with said wires and being adapted to support said wires to prevent distortion thereof, substantially as described.

In testimony whereof I have hereunto set my hand in the presence of two subscribing witnesses.

EMIL CLEMENS HORST.

Witnesses:
 THEO. EDER,
 MILTON N. MILLER.